United States Patent
Oh et al.

(10) Patent No.: US 10,601,250 B1
(45) Date of Patent: Mar. 24, 2020

(54) ASYMMETRIC DUTY CONTROL OF A HALF BRIDGE POWER CONVERTER

(71) Applicant: Apple Inc., Cupertino, CA (US)

(72) Inventors: InHwan Oh, Cupertino, CA (US); Shimon Elkayam, Cupertino, CA (US); Manisha P. Pandya, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 265 days.

(21) Appl. No.: 15/476,472

(22) Filed: Mar. 31, 2017

Related U.S. Application Data

(60) Provisional application No. 62/398,086, filed on Sep. 22, 2016.

(51) Int. Cl.
*H02J 50/00* (2016.01)
*H02J 50/05* (2016.01)
*H02J 50/12* (2016.01)
*H02J 7/02* (2016.01)
(Continued)

(52) U.S. Cl.
CPC .............. *H02J 50/12* (2016.02); *H02J 7/025* (2013.01); *H02J 50/40* (2016.02); *H02J 50/80* (2016.02)

(58) Field of Classification Search
None
See application file for complete search history.

(56) References Cited

U.S. PATENT DOCUMENTS

| | | |
|---|---|---|
| 5,157,319 A | 10/1992 | Klontz et al. |
| 5,710,503 A | 1/1998 | Sideris et al. |
| 5,742,148 A | 4/1998 | Sudo et al. |

(Continued)

FOREIGN PATENT DOCUMENTS

| | | |
|---|---|---|
| CA | 2489701 | 6/2006 |
| CN | 1653670 | 8/2005 |

(Continued)

OTHER PUBLICATIONS

"Benefits of Optical Communications," NASA, published May 6, 2014, accessed online Feb. 24, 2017, https://www.nasa.gov/directorates/heo/scan/engineering/technology/txt_opticalcomm_benefits.html, 3 pages.

(Continued)

*Primary Examiner* — Jared Fureman
*Assistant Examiner* — Aqeel H Bukhari
(74) *Attorney, Agent, or Firm* — Brownstein Hyatt Farber Schreck, LLP

(57) ABSTRACT

A half bridge power converter can be coupled to, or included in, a wireless transmitter device. The half bridge power converter includes an upper switching element connected between a direct current supply voltage and a lower switching element. A duty controller is coupled to the upper and the lower switching elements and is configured to asymmetrically control the duty cycles of the upper and lower switching elements based on a voltage level of the direct current supply voltage. In general, the duty cycle of the lower switching element is different than the duty cycle of the upper switching element. Additionally or alternatively, the duty controller is configured to determine and control the duty cycles of the upper and lower switching elements to adjust a direct current gain of a wireless energy transfer system that includes the wireless transmitter device.

20 Claims, 7 Drawing Sheets

(51) Int. Cl.
*H02J 50/40* (2016.01)
*H02J 50/80* (2016.01)

(56) References Cited

U.S. PATENT DOCUMENTS

| | | | |
|---|---|---|---|
| 5,764,572 A | 6/1998 | Hammick | |
| 5,821,731 A | 10/1998 | Kuki | |
| 5,917,429 A | 6/1999 | Otis, Jr. et al. | |
| 6,567,522 B1 | 5/2003 | Blackburn | |
| 6,825,620 B2 | 11/2004 | Kuennen | |
| 6,844,702 B2 | 1/2005 | Giannopoulos et al. | |
| 6,885,529 B2 | 4/2005 | Ker et al. | |
| 7,047,051 B2 | 5/2006 | Sackett et al. | |
| 7,072,697 B2 | 7/2006 | Lappetelainen | |
| 7,212,414 B2 | 5/2007 | Baarman | |
| 7,271,727 B2 | 9/2007 | Steeves | |
| 7,522,878 B2 | 4/2009 | Baarman | |
| 7,546,477 B2 | 6/2009 | Breen | |
| 7,560,902 B2 | 7/2009 | Unger | |
| 7,604,178 B2 | 10/2009 | Stewart | |
| 7,605,496 B2 | 10/2009 | Stevens et al. | |
| 7,613,484 B2 | 11/2009 | Lappetelainen et al. | |
| 7,639,514 B2 | 12/2009 | Baarman | |
| 7,668,044 B2 | 2/2010 | Brinkman | |
| 7,760,101 B2 | 7/2010 | Ales, III et al. | |
| 7,948,208 B2 | 5/2011 | Partovi et al. | |
| 7,952,322 B2 | 5/2011 | Partovi et al. | |
| 8,004,235 B2 | 8/2011 | Baarman et al. | |
| 8,049,370 B2 | 11/2011 | Azancot et al. | |
| 8,094,475 B2 | 1/2012 | Friebe et al. | |
| 8,115,420 B2 | 2/2012 | Morooka et al. | |
| 8,129,864 B2 | 3/2012 | Baarman et al. | |
| 8,169,185 B2 | 5/2012 | Partovi et al. | |
| 8,222,990 B2 | 7/2012 | Gerner | |
| 8,314,513 B2 | 11/2012 | Aoyama et al. | |
| 8,330,414 B2 | 12/2012 | Takahashi et al. | |
| 8,441,244 B2 | 5/2013 | Bianco et al. | |
| 8,446,046 B2 | 5/2013 | Fells et al. | |
| 8,456,038 B2 | 6/2013 | Azancot et al. | |
| 8,519,666 B2 | 8/2013 | Terao et al. | |
| 8,531,153 B2 | 9/2013 | Baarman et al. | |
| 8,587,279 B2 | 11/2013 | Wang | |
| 8,629,652 B2 | 1/2014 | Partovi et al. | |
| 8,629,654 B2 | 1/2014 | Partovi et al. | |
| 8,729,814 B2 | 5/2014 | Salvestrini | |
| 8,766,488 B2 | 7/2014 | Azancot et al. | |
| 8,786,314 B2 | 7/2014 | Maruyama et al. | |
| 8,855,554 B2 | 10/2014 | Cook et al. | |
| 8,860,365 B2 | 10/2014 | Chan | |
| 8,872,386 B2 | 10/2014 | Mach et al. | |
| 8,890,453 B2 | 11/2014 | Kure | |
| 8,890,470 B2 | 11/2014 | Partovi | |
| 8,896,264 B2 | 11/2014 | Partovi | |
| 8,901,881 B2 | 12/2014 | Partovi | |
| 8,928,276 B2 | 1/2015 | Kesler | |
| 8,933,594 B2 | 1/2015 | Kurs | |
| 8,942,624 B2 | 1/2015 | Singh et al. | |
| 8,947,042 B2 | 2/2015 | Kirby et al. | |
| 8,947,047 B2 | 2/2015 | Partovi et al. | |
| 8,963,514 B2 | 2/2015 | Rehm | |
| 8,994,326 B2 | 3/2015 | Takada et al. | |
| 9,000,620 B2 | 4/2015 | Kim et al. | |
| 9,013,895 B2 | 4/2015 | Baarman | |
| 9,018,898 B2 | 4/2015 | Ziv et al. | |
| 9,030,843 B1 | 5/2015 | Herbert | |
| 9,036,371 B2 | 5/2015 | Baarman | |
| 9,045,050 B2 | 6/2015 | Tsai et al. | |
| 9,054,546 B2 | 6/2015 | Zhao | |
| 9,065,489 B2 | 6/2015 | Mach et al. | |
| 9,087,638 B2 | 7/2015 | Oettinger | |
| 9,088,168 B2 | 7/2015 | Mach et al. | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,124,121 B2 | 9/2015 | Ben-Shalom et al. | |
| 9,160,421 B2 | 10/2015 | Kim et al. | |
| 9,178,369 B2 | 11/2015 | Partovi | |
| 9,178,387 B2 | 11/2015 | Mohammadian et al. | |
| 9,178,512 B2 | 11/2015 | Froniewski et al. | |
| 9,190,874 B2 | 11/2015 | Baarman | |
| 9,203,475 B2 | 12/2015 | Kim et al. | |
| 9,231,411 B2 | 1/2016 | Baarman et al. | |
| 9,246,356 B2 | 1/2016 | Baarman | |
| 9,252,766 B2 | 2/2016 | Ren et al. | |
| 9,253,002 B2 | 2/2016 | Noguchi et al. | |
| 9,257,851 B2 | 2/2016 | Baarman et al. | |
| 9,362,779 B2 | 2/2016 | Takahashi | |
| 9,275,789 B2 | 3/2016 | Irie et al. | |
| 9,276,413 B1 | 3/2016 | Zhang | |
| 9,276,437 B2 | 3/2016 | Partovi et al. | |
| 9,300,147 B2 | 3/2016 | Lee et al. | |
| 9,306,462 B2 | 4/2016 | Yau | |
| 9,331,694 B2 | 5/2016 | Li et al. | |
| 9,356,472 B2 | 5/2016 | Fritsch | |
| 9,356,659 B2 | 5/2016 | Partovi | |
| 9,384,885 B2 | 7/2016 | Karalis et al. | |
| 9,405,303 B2 | 8/2016 | Zikes et al. | |
| 9,407,109 B2 | 8/2016 | Takahashi et al. | |
| 9,461,501 B2 | 10/2016 | Partovi et al. | |
| 9,461,714 B2 | 10/2016 | Cook et al. | |
| 9,479,112 B2 | 10/2016 | Rehm | |
| 9,496,732 B2 | 11/2016 | Partovi | |
| 9,496,733 B2 | 11/2016 | Van Funderburk | |
| 9,496,793 B2 | 11/2016 | Bruwer et al. | |
| 9,509,168 B2 | 11/2016 | Ye | |
| 9,548,625 B2 | 1/2017 | Mach et al. | |
| 9,577,440 B2 | 2/2017 | Partovi et al. | |
| 9,583,970 B2 | 2/2017 | Hsia et al. | |
| 9,595,834 B2 | 3/2017 | Yamamoto et al. | |
| 9,673,784 B2 | 6/2017 | Menzel et al. | |
| 9,685,699 B2 | 6/2017 | Mahanfar et al. | |
| 9,716,402 B2 | 7/2017 | Kirby | |
| 9,728,982 B2 | 8/2017 | Yamamoto et al. | |
| 9,729,009 B2 | 8/2017 | Fritsch | |
| 9,785,806 B2 | 10/2017 | Bartholomew et al. | |
| 9,787,364 B2 | 10/2017 | Moore et al. | |
| 9,806,542 B2 | 10/2017 | Asanuma | |
| 9,837,846 B2 | 12/2017 | Partovi | |
| 9,843,199 B2 | 12/2017 | Bosshard et al. | |
| 9,843,219 B2 | 12/2017 | Ye et al. | |
| 9,897,989 B2 | 2/2018 | Fitch | |
| 9,906,049 B2 | 2/2018 | Baarman | |
| 9,978,494 B2 | 5/2018 | Ngahu | |
| 10,008,884 B2 | 6/2018 | Zhang | |
| 10,027,185 B2 | 7/2018 | Moyer | |
| 10,050,437 B2 | 8/2018 | Nomoto | |
| 10,068,701 B2 | 9/2018 | Azancot et al. | |
| 10,079,512 B2 | 9/2018 | Rehm | |
| 10,097,047 B2 | 10/2018 | Yamamoto et al. | |
| 10,110,075 B2 | 10/2018 | Podkamien et al. | |
| 10,116,145 B2 | 10/2018 | Reynolds et al. | |
| 10,135,260 B2 | 11/2018 | Lee et al. | |
| 10,135,305 B2 | 11/2018 | Muratov et al. | |
| 2007/0205872 A1 | 9/2007 | Kim et al. | |
| 2011/0050164 A1 | 3/2011 | Partovi et al. | |
| 2011/0199045 A1 | 8/2011 | Hui et al. | |
| 2012/0068548 A1 | 3/2012 | Endo et al. | |
| 2012/0139359 A1 | 6/2012 | Lai et al. | |
| 2013/0093388 A1 | 4/2013 | Partovi | |
| 2013/0099563 A1 | 4/2013 | Partovi et al. | |
| 2013/0162051 A1 | 6/2013 | Michihata et al. | |
| 2013/0207468 A1* | 8/2013 | Wu | H01F 38/14 307/31 |
| 2013/0260677 A1 | 10/2013 | Partovi | |
| 2013/0271069 A1 | 10/2013 | Partovi | |
| 2013/0285605 A1 | 10/2013 | Partovi | |
| 2013/0300204 A1 | 11/2013 | Partovi | |
| 2013/0300209 A1* | 11/2013 | Long | H02J 50/12 307/104 |
| 2014/0132210 A1 | 5/2014 | Partovi | |
| 2014/0152262 A1 | 6/2014 | Nomoto | |
| 2014/0191568 A1 | 7/2014 | Partovi | |
| 2014/0306654 A1 | 10/2014 | Partovi | |

(56) References Cited

U.S. PATENT DOCUMENTS

| | | |
|---|---|---|
| 2015/0035372 A1 | 2/2015 | Aioanei |
| 2015/0061588 A1 | 3/2015 | Alves et al. |
| 2015/0097438 A1 | 4/2015 | Aioanei |
| 2015/0097443 A1 | 4/2015 | Moyer et al. |
| 2015/0130412 A1 | 5/2015 | Partovi |
| 2015/0137617 A1 | 5/2015 | Menzel et al. |
| 2015/0137750 A1 | 5/2015 | Kirby et al. |
| 2015/0194814 A1 | 7/2015 | Taylor et al. |
| 2015/0244341 A1 | 8/2015 | Ritter et al. |
| 2015/0249359 A1 | 9/2015 | Gunderson |
| 2015/0249484 A1 | 9/2015 | Mach et al. |
| 2015/0303699 A1 | 10/2015 | Wagman et al. |
| 2016/0013714 A1 | 1/2016 | Young |
| 2016/0056662 A1 | 2/2016 | Yoon |
| 2016/0094074 A1 | 3/2016 | Alves et al. |
| 2016/0126775 A1 | 5/2016 | Park et al. |
| 2016/0134134 A1 | 5/2016 | Baarman et al. |
| 2016/0134154 A1 | 5/2016 | Baarman et al. |
| 2017/0025896 A1 | 1/2017 | Partovi et al. |
| 2017/0070103 A1 | 3/2017 | Kim et al. |
| 2017/0093218 A1 | 3/2017 | Hrinya et al. |
| 2017/0126071 A1 | 5/2017 | Aioanei |
| 2017/0126281 A1 | 5/2017 | Cook et al. |
| 2017/0259677 A1 | 9/2017 | Stewing et al. |
| 2017/0272058 A1 | 9/2017 | Menzel et al. |
| 2017/0288467 A1 | 10/2017 | Hrinya et al. |
| 2017/0288472 A1 | 10/2017 | Stoufer et al. |
| 2017/0338695 A1 | 11/2017 | Port |
| 2018/0019597 A1 | 1/2018 | Baarman |
| 2018/0240585 A1 | 8/2018 | Ngahu |
| 2018/0358834 A1 | 12/2018 | Partovi |
| 2019/0058332 A1 | 2/2019 | Lee et al. |

FOREIGN PATENT DOCUMENTS

| | | |
|---|---|---|
| CN | 101621220 | 1/2010 |
| CN | 101902062 | 12/2010 |
| CN | 102934319 | 2/2013 |
| CN | 103427499 | 12/2013 |
| JP | H0767263 | 3/1995 |
| JP | 2010213414 | 9/2010 |
| JP | 2012005238 | 1/2012 |
| JP | 2013169081 | 8/2013 |
| KR | 20100110356 | 10/2010 |
| KR | 1020130106840 | 9/2013 |
| WO | WO 08/044875 | 4/2008 |
| WO | WO 11/102901 | 8/2011 |
| WO | WO 13/090565 | 6/2013 |
| WO | WO 13/142720 | 9/2013 |

OTHER PUBLICATIONS

Zhusheng et al., "Design and Application of Wireless Charging Technology for Electric Vehicle," *Electric Age*, May 31, 2012, vol. 5, pp. 26-28 (10 pages with translation).

Johns et al., "Designing a Qi-compliant receiver coil for wireless power systems, Part 1," Texas Instruments Incorporated, High-Performance Analog Products, *Analog Applications Journal*, www.ti.com/aaj, 3Q 2012, 9 pages.

"System Description Wireless Power Transfer," vol. I: Low Power, Part 1: Interface Definition, Version 1.0.1, Wireless Power Consortium, Oct. 2010, 86 pages.

"System Description Wireless Power Transfer," vol. I: Low Power, Part 1: Interface Definition, Version 1.1.1, Wireless Power Consortium, Jul. 2012, 247 pages.

\* cited by examiner

ASYMMETRIC DUTY CONTROL OF A HALF BRIDGE POWER CONVERTER

CROSS-REFERENCE TO RELATED APPLICATION(S)

This application is a nonprovisional patent application of, and claims the benefit to, U.S. Provisional Patent Application No. 62/398,086, filed Sep. 22, 2016 and titled "Asymmetric Duty Control Of A Half Bridge Power Converter," the disclosure of which is hereby incorporated herein in its entirety.

FIELD

The described embodiments relate generally to wireless energy transfer systems. More particularly, the present embodiments relate to an asymmetric duty control of a half bridge power converter.

BACKGROUND

Some electronic devices are configured to receive power wirelessly. A user may place the electronic device on a charging surface of a wireless charging device to transfer power from the charging device to the electronic device. The charging device transfers power to the electronic device through inductively coupling between a transmitter coil in the charging device and a receiver coil in the electronic device.

In some instances, a wireless charging device is constructed to only transfer energy to a particular electronic device. This can increase the cost to a user who uses wireless charging for multiple electronic devices. Because each electronic device may operate only with a particular charging device, a user may be required to purchase multiple charging devices.

SUMMARY

Embodiments described herein relate to a transmitter device that is configured to transfer energy to one or more receiver devices. The transmitter device includes at least one half bridge power converter, where each half bridge power converter is coupled to one or more transmitter coils. The energy output of each transmitter coil is regulated by controlling a duty cycle of a corresponding half bridge power converter. In particular, based on a voltage level of a direct current (DC) supply voltage connected to an upper switching element of a half bridge power converter, a first duty cycle of the upper switching element is controlled asymmetrically with respect to a second duty cycle of the lower switching element in the half bridge power converter. The amount of energy transferred by a transmitter coil can be regulated by the first duty cycle of the upper switching element. In particular, the amount of time that a voltage is applied across a transmitter coil corresponds to the first duty cycle of the upper switching element.

Additionally, in some embodiments, the half bridge power converter operates with a fixed switching frequency. The fixed switching frequency can substantially match the resonating frequency of a wireless energy transfer system. The fixed switching frequency, along with the asymmetric duty control, can be used to dynamically adjust a gain transfer function of a wireless energy transfer system that includes the wireless transmitter device. In some situations, the DC gain of the wireless energy transfer system can be adjusted based on an adjustment of the first and the second duty cycles in a half bridge power converter. In some embodiments, the resonating frequency can be adjusted. In such embodiments, the switching frequency of the half bridge power converter may be adjusted as well. Thus, the half bridge power converter can operate with a variable switching frequency.

In one aspect, a power converter circuit includes a half bridge power converter coupled between a DC supply voltage and a reference voltage (e.g., ground), a transmitter coil coupled to the half bridge power converter, and a duty controller coupled between the half bridge power converter and the DC supply voltage. The half bridge power converter operates at a fixed switching frequency or with a variable switching frequency. Based on the DC supply voltage, the duty controller is configured to adjust a duty cycle of the half bridge power converter.

In another aspect, a wireless energy transfer system includes a transmitter device and a receiver device. The transmitter device includes a half bridge power converter coupled between a direct current (DC) supply voltage source and a ground, a transmitter resonant circuitry coupled between the half bridge power converter and a transmitter coil, and a duty controller coupled between the half bridge power converter and the DC supply voltage source. The receiver device includes a receiver coil and a receiver resonant circuitry coupled between the receiver coil and a load. The duty controller is configured to adjust a gain transfer function of the wireless energy transfer system by controlling a duty cycle of the half bridge power converter.

In yet another aspect, a wireless transmitter device includes a transmitter coil coupled to a half bridge power converter. The half bridge power converter includes an upper switching element coupled in series with a lower switching element that operate at a fixed switching frequency. A method of operating the wireless transmitter device includes receiving a direct current (DC) supply voltage that is coupled to the upper switching element, and based on a voltage level of the DC supply voltage, controlling a first duty cycle of the upper switching element and a second duty cycle of the lower switching element asymmetrically to regulate an energy output of the transmitter coil. In some embodiments, the second duty cycle is greater than the first duty cycle. In other embodiments, the second duty cycle may be equal to the first duty cycle.

In another aspect, a transmitter device in a wireless energy transfer system includes a transmitter coil coupled to a half bridge power converter. The half bridge power converter includes an upper switching element connected in series with a lower switching element. A method of operating the transmitter device includes transmitting a first switch signal having a first duty cycle to the upper switching element and transmitting a second switch signal having a second duty cycle to the lower switching element to transfer energy from the transmitter coil. A switching frequency of the half bridge power converter is fixed and the second duty cycle is greater than the first duty cycle. The first and the second duty cycles are adjusted to adjust a gain transfer function of the wireless energy transfer system, where the adjusted second duty cycle remains greater than the adjusted first duty cycle. In other embodiments, the first and the second duty cycles are equal and the adjusted first and the adjusted second duty cycles remain equal.

BRIEF DESCRIPTION OF THE DRAWINGS

The disclosure will be readily understood by the following detailed description in conjunction with the accompanying drawings, wherein like reference numerals designate like structural elements, and in which.

Figure 1:
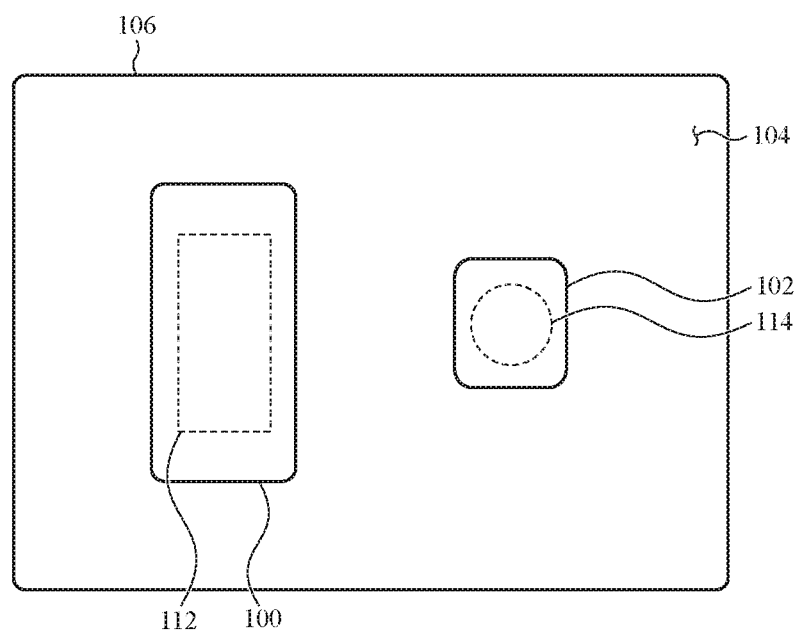
FIG. 1 shows an example transmitter device that is configured to transfer energy wirelessly to one or more receiver devices.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a half bridge power converter that is coupled to, or included in, a wireless transmitter device. The half bridge power converter includes an upper switching element connected in series to a lower switching element. A duty controller is coupled to the upper and lower switching elements and configured to asymmetrically control the duty cycles of the upper and lower switching elements. In particular, the duty controller is configured to control a first duty cycle of the upper switching element and a second duty cycle of lower switching element, where the second duty cycle is different from the first duty cycle. For example, the second duty cycle can be greater than the first duty cycle.

The amount of energy transferred by a transmitter coil coupled to the half bridge power converter is regulated through the asymmetrical control of the first and the second duty cycles. Additionally, in some embodiments, the half bridge power converter operates with a fixed switching frequency. The fixed switching frequency can substantially match the resonant frequency of a wireless energy transfer system. The fixed switching frequency, along with the asymmetric duty control, can be used to adjust a direct current (DC) gain of a wireless energy transfer system. In some embodiments, the resonant frequency can be adjusted and the switching frequency of the half bridge power converter varied accordingly.

As used herein, the terms "connected" and "coupled" are generally intended to be construed broadly to cover direct connections and indirect connections. In the context of the present invention, the terms "connected" and "coupled" are intended to cover circuits, components, and/or devices that are connected such that an electrical parameter passes from one to another. Example electrical parameters include, but are not limited to, voltages, currents, magnetic fields, control signals, and/or communication signals. Thus, the terms "coupled" and "connected" include circuits, components, and/or devices that are coupled directly together or through one or more intermediate circuits, components, and/or devices.

These and other embodiments are discussed below with reference to FIGS. 1-7. However, those skilled in the art will readily appreciate that the detailed description given herein with respect to these Figures is for explanatory purposes only and should not be construed as limiting.

FIG. 1 depicts one example of a transmitter device that is configured to transfer energy wirelessly to one or more receiver devices. In the illustrated embodiment, a first receiver device 100 and a second receiver device 102 are placed on a transmitting surface 104 of a transmitter device 106. The transmitter device 106 is configured to transfer energy wirelessly to the first and the second receiver devices 100, 102 sequentially, simultaneously, or partially overlapping in time.

The transmitter device 106 is configured to convert a DC signal into a first alternating current (AC) signal (e.g., a first AC voltage). The first AC signal is used by the transmitter device 106 to generate one or more time-varying or oscillating magnetic fields that are used to transfer energy wirelessly from one or more transmitter coils (not shown) in the transmitter device 106 to one or more receiver coils 112 in the first receiver device 100 when the first receiver device 100 is placed on or near the transmitting surface 104 of the transmitter device 106.

Additionally, the transmitter device 106 is configured to convert the DC signal into a second AC signal (e.g., a second AC voltage). The second AC signal may be the same signal as the first AC signal or a different signal compared to the first AC signal. The second AC signal is used by the transmitter device 106 to generate one or more time-varying or oscillating magnetic fields that are used to transfer energy wirelessly from one or more transmitter coils (not shown) in the transmitter device 106 to one or more receiver coils 114 in the second receiver device 102 when the second receiver device 102 is placed on or near the transmitting surface 104 of the transmitter device 106.

Any suitable wireless transmitter device can be used. Example transmitter devices include, but are not limited to, a wireless charging puck or pad, a wireless charging station, clothing that is configured to wirelessly charge a receiver device, a wireless charging dock, and a wireless charging cover or door that can be removably attached to the housing of the receiver device (e.g., a wireless charging cover that replaces a battery door).

Similarly, any suitable receiver device that is configured to receive energy wirelessly can be used. For example, a receiver device may be a gaming device, a remote control, a wearable electronic device (e.g., a smart watch), a tablet or laptop computing device, a digital media player, a kitchen or household appliance, a motor vehicle, and so on.

Figure 2:
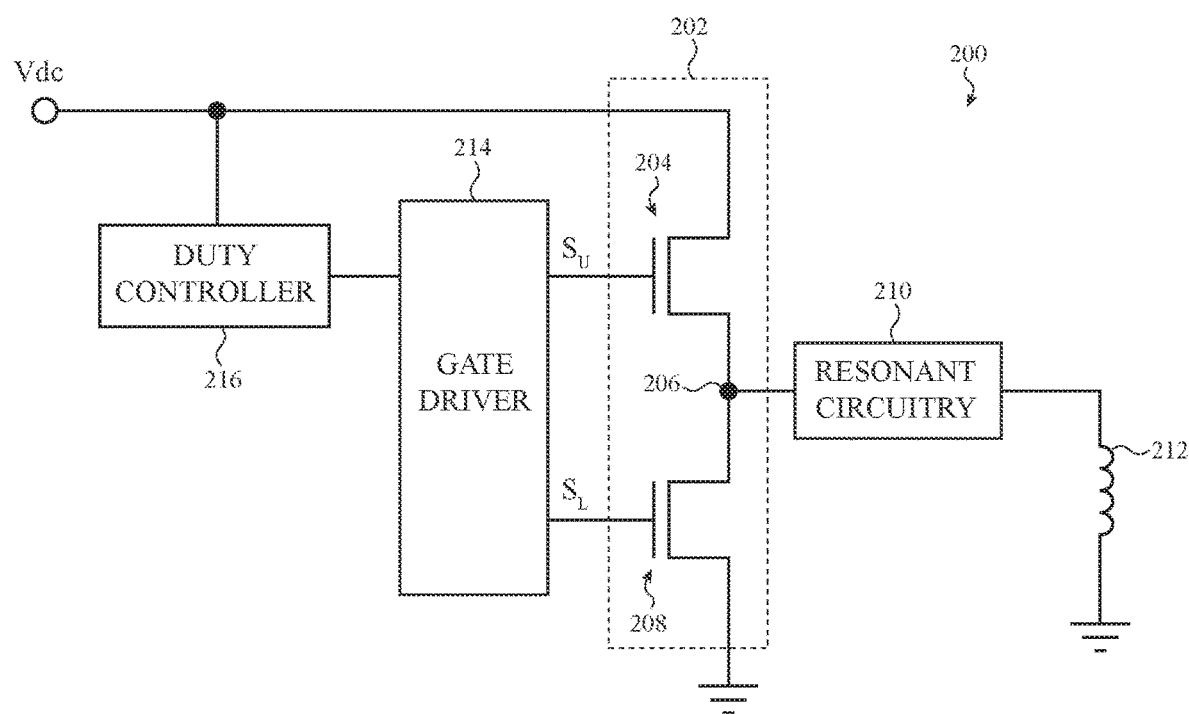
FIG. 2 depicts an example power converter circuit that is suitable for use in the transmitter device shown in FIG. 1.

The transmitter device 106 includes one or more power converter circuits that are configured to produce the oscillating magnetic fields. FIG. 2 depicts an example power converter circuit that is suitable for use in the transmitter device shown in FIG. 1. The power converter circuit 200 includes a half bridge power converter 202 coupled between a DC input voltage source (Vdc) and a reference voltage source (e.g., ground). In particular, the half bridge power converter 202 includes an upper switching element 204 connected between the DC input voltage source and an intermediate node 206, and a lower switching element 208 connected between the intermediate node 206 and the reference voltage source. The upper and lower switching elements 204, 208 are activated (e.g., turned on or opened) and deactivated (e.g., turned off or closed) complementary to each other by applying a switch signal $S_U$ to the upper switching element 202 and a switch signal $S_L$ to the lower switching element 208.

Any suitable switching element can be used. In one embodiment, the upper and lower switching elements 204, 208 are metal-oxide semiconductor field-effect transistors. Other embodiments can use a different type of switching element or semiconductor switch, such as a bi-polar transistor, a diode, or any other suitable electronic switch.

Transmitter resonant circuitry 210 is coupled between the intermediate node 206 and a transmitter coil 212. The transmitter resonant circuitry 210 may include one or more electrical components (e.g., resistors, capacitors, inductors) that are used to determine a resonating frequency for the transmitter device when energy is transferred from the transmitter coil 212 to a receiver coil in a receiver device. For example, the transmitter resonant circuitry 210 may include resistors, capacitors, and/or inductors connected in any arrangement, such as in series, in parallel, or combinations thereof.

When energy is to be transferred wirelessly from the transmitter coil 212, the upper and lower switching elements 204, 208 are alternately opened (e.g., turned off or deactivated) and closed (e.g., turned on or activated) to produce an alternating current (AC) coil signal (e.g., an AC coil voltage). The AC coil signal passes through the transmitter coil 212 to produce one or more time-varying or oscillating magnetic fields. The amount of energy transferred from the transmitter coil 212 is controlled through asymmetric duty control of the upper and lower switching elements 204, 208. The amount of time the upper switching element 204 is turned on is a first duty cycle and the amount of time the lower switching element 208 is turned on is a second duty cycle. In one embodiment, the first duty cycle is less than the second duty cycle. An example timing diagram of the first and the second duty cycles is shown and described in more detail in conjunction with FIG. 3.

A gate driver circuit 214 is coupled between a duty controller 216 and the upper and lower switching elements 204, 208. The gate driver circuit 214 is configured to provide the first and the second switch signals (e.g., $S_U$ and $S_L$) to the first and the second switching elements 204, 208 in the half bridge power converter 202.

The duty controller 216 is coupled between the DC supply voltage source Vdc and the gate driver circuit 214. The duty controller 216 is configured to determine and control the first duty cycle of the upper switching element 204 based on the voltage level of Vdc. In general, the duty controller 216 sets and/or adjusts the first duty cycle to a shorter duty cycle and determines and/or adjusts the second duty cycle to a longer duty cycle when the DC supply voltage is higher. Conversely, the duty controller 216 determines and/or adjusts the first duty cycle to a longer duty cycle and sets and/or adjusts the second duty cycle to a shorter duty cycle when the DC supply voltage is lower. In this manner, the duty controller 216 can compensate for variations in the DC supply voltage to maintain the delivered output energy (e.g., the output voltage) of the transmitter coil 212 at a substantially constant level. Additionally, in some embodiments, ripple voltages included in the DC supply voltage, Vdc, can be reduced or cancelled by modulating the first duty cycle with the ripple voltages.

In some embodiments, the duty controller 216 determines and/or adjusts the first and the second duty cycles based on the DC supply voltage falling into one of several (two or more) supply voltage ranges. Any suitable number of supply voltage ranges can be used. In such embodiments, the first and the second duty cycles are not changed based on small variations in the DC supply voltage.

The half bridge power converter 202, the transmitter resonant circuitry 210, the gate driver circuit 214, and the duty controller 216 can be included in the transmitter device or distributed between the transmitter device and at least one other electronic device. For example, in one embodiment, the half bridge power converter 302, the gate driver circuit 214, and the duty controller 216 may be included in a power adapter that is coupled to the wireless transmitter device (e.g., a power adapter that couples the transmitter device to a power source, such as a wall outlet) and the transmitter resonant circuitry 210 and the transmitter coil 212 can be included in the transmitter device. In another embodiment, the transmitter coil 212 may be included in the transmitter device and the half bridge power converter 202, the transmitter resonant circuitry 210, the gate driver circuit 214, and the duty controller 216 can be included in a power adapter.

Figure 3:
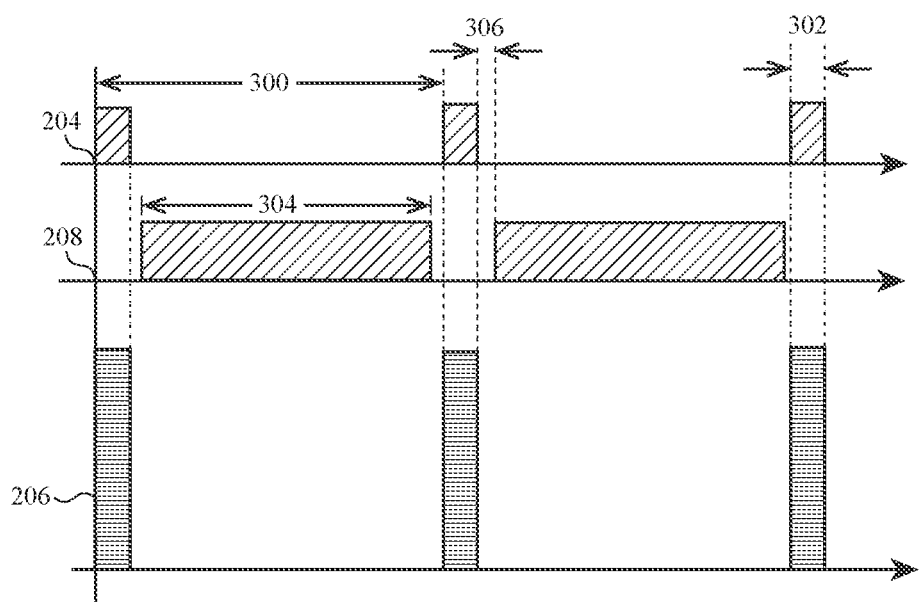
FIG. 3 shows an example timing diagram that is suitable for use with the half bridge power converter circuit shown in FIG. 2.

FIG. 3 shows an example timing diagram that is suitable for use with the half bridge power converter shown in FIG. 2. An example first duty cycle 302 of the upper switching element 204 is illustrated in the top plot shown in FIG. 3. An example second duty cycle 304 of the lower switching element 208 is depicted in the middle plot, and a representative amount of time that a voltage is applied to the intermediate node 206 is shown in the bottom plot.

Figure 4:
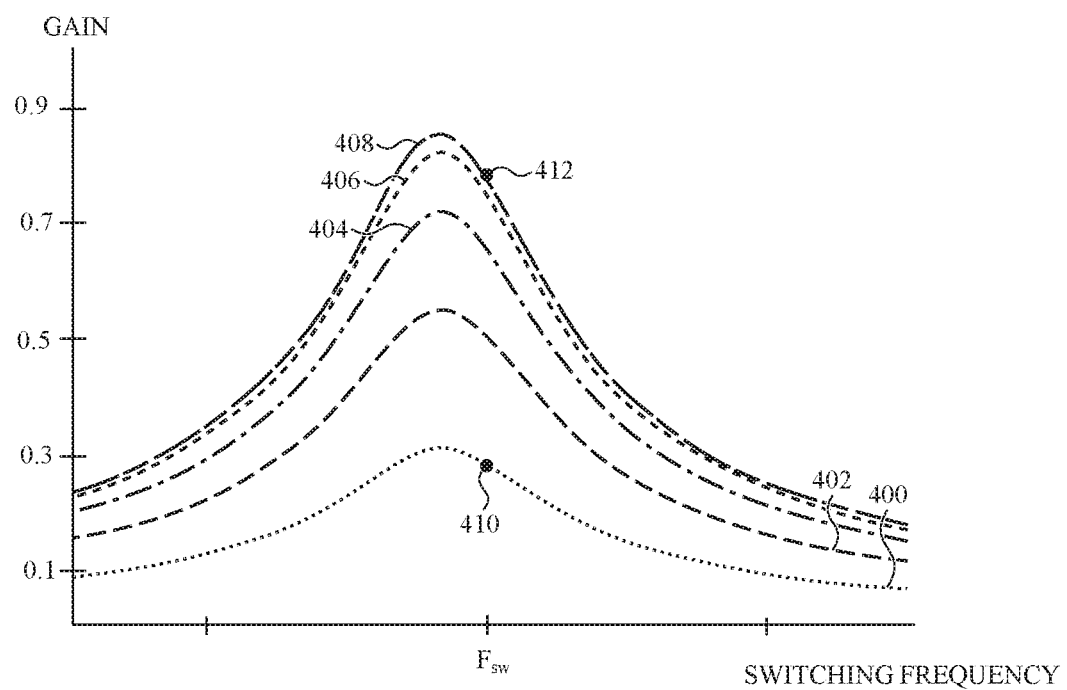
FIG. 4 depicts example plots of DC gains versus switching frequencies at different duty cycles.

The half bridge power converter 202 operates at a fixed switching frequency 300. In some embodiments, the fixed switching frequency 300 corresponds to the resonant frequency of the resonating transmitter and receiver coils. In general, the combination of the first and the second duty cycles 302, 304 is equal to, or less than, the switching duration (e.g., the fixed switching frequency 300). With the asymmetric duty control, the first duty cycle 302 can be any percentage of the fixed switching frequency 300, where the maximum percentage is less than fifty percent. Similarly, the second duty cycle 304 may be any percentage of the fixed switching frequency 300, where the maximum percentage is (1—first duty cycle). The first and the second duty cycles 302, 304 can be based on several factors, including, but not limited to, the power requirements of a receiver device, the transmitter and receiver coil characteristics, the coupling efficiency between the transmitter and receiver coils, and the coupling factor. As shown in FIG. 4, the second duty cycle 304 is greater than the first duty cycle 302. In other embodiments, the first and the second duty cycles 302, 304 can have different values. For example, the second duty cycle 304 may equal the first duty cycle 302.

The amount of time that a voltage is applied to intermediate node 206 corresponds to the first duty cycle 302. In particular, the time period in which a voltage is applied to the intermediate node 206 is controlled by the first duty cycle 302. Changing the first duty cycle 302 changes the current through a transmitter coil, which in turn changes the net energy transferred by the transmitter coil. For example, increasing the first duty cycle 302 increases the current through the transmitter coil because a voltage is applied to the intermediate node 206 for a longer period of time. The increased current through the transmitter coil increases the net energy transferred by the transmitter coil. Conversely, decreasing the first duty cycle 302 decreases the current through the transmitter coil because a voltage is applied to the intermediate node 206 for a shorter period of time. The decreased current through the transmitter coil may decrease the net energy transferred by the transmitter coil. Accordingly, the amount of energy that is transferred by a transmitter coil can be regulated by the first duty cycle 302.

Thus, a half bridge power converter can operate in two modes. In a first mode, the upper switching element 204 is coupled to the DC supply voltage for a first period of time (e.g., the first duty cycle). Accordingly, one or more transmitter coils are connected to the DC supply voltage for the first duty cycle and can transfer energy during the first duty cycle.

In a second mode, the upper switching element 204 is decoupled from the DC supply voltage for a longer second period of time (e.g., the second duty cycle). Hence, the one or more transmitter coils are disconnected from the DC supply voltage for the longer second duty cycle.

A dead time period 306 represents a delay period between turning on one switching element and turning on the other switching element in the half bridge power converter 202. The dead time period 306 prevents the upper and lower switching elements 204, 208 from being turn on at the same time. In some situations, the power converter 202 can be damaged when the upper and lower switching elements 204, 208 are turned on at the same time.

The time periods of the first duty cycle 302, the second duty cycle 304, and the dead time period 306 depicted in FIG. 3 are illustrative only. The actual time periods of the first and the second duty cycles 302, 304 and the dead time period 306 can be any suitable amount of time. In particular, the combination of the first duty cycle 302, the second duty cycle 304, and the dead time period 306 is equal to the fixed switching frequency 300.

In general, a wireless power transfer system can be modeled as a transfer function, typically referred to as a gain transfer function. The gain transfer function can be modified by the transmitter device to affect the transfer of energy to a receiver device. Changing one or more characteristics of the operation of the transmitter device can change one or more characteristics of the gain transfer function. For example, in some embodiments, the DC gain of the wireless power transfer system can be adjusted through the asymmetric duty control of the half bridge power converter. In particular, the DC gain of the wireless energy transfer system can be adjusted in response to varying the first and the second duty cycles 302, 304.

FIG. 4 depicts example plots of DC gains across different switching frequencies at different duty cycles. Plot 400 represents the DC gain of a wireless energy transfer system across different switching frequencies (e.g., 300 in FIG. 3) when the first duty cycle of the upper switching element (e.g., 202 in FIG. 2) is 0.1 or 10%. Plot 402 illustrates the DC gain of the wireless energy transfer system when the first duty cycle of the upper switching element is 0.2 or 20%. Plot 404 illustrates the DC gain when the first duty cycle of the upper switching element is 0.3 or 30%. Similarly, plot 406 illustrates the DC gain when the first duty cycle of the upper switching element is 0.4 or 40% and plot 408 illustrates the DC gain when the first duty cycle of the upper switching element is 0.5 or 50%.

As depicted in FIG. 4, the DC gain increases in response to an increase in the first duty cycle and decreases in response to a decrease in the first duty cycle. For example, at the switching frequency $F_{SW}$, the DC gain is approximately 0.28 (represented by point 410) when the first duty cycle is 0.10. At the same switching frequency $F_{SW}$, the DC gain is approximately 0.78 (represented by point 412) when the first duty cycle is 0.5. Accordingly, the first duty cycle can be used to adjust the DC gain of the wireless energy transfer system.

Figure 5:
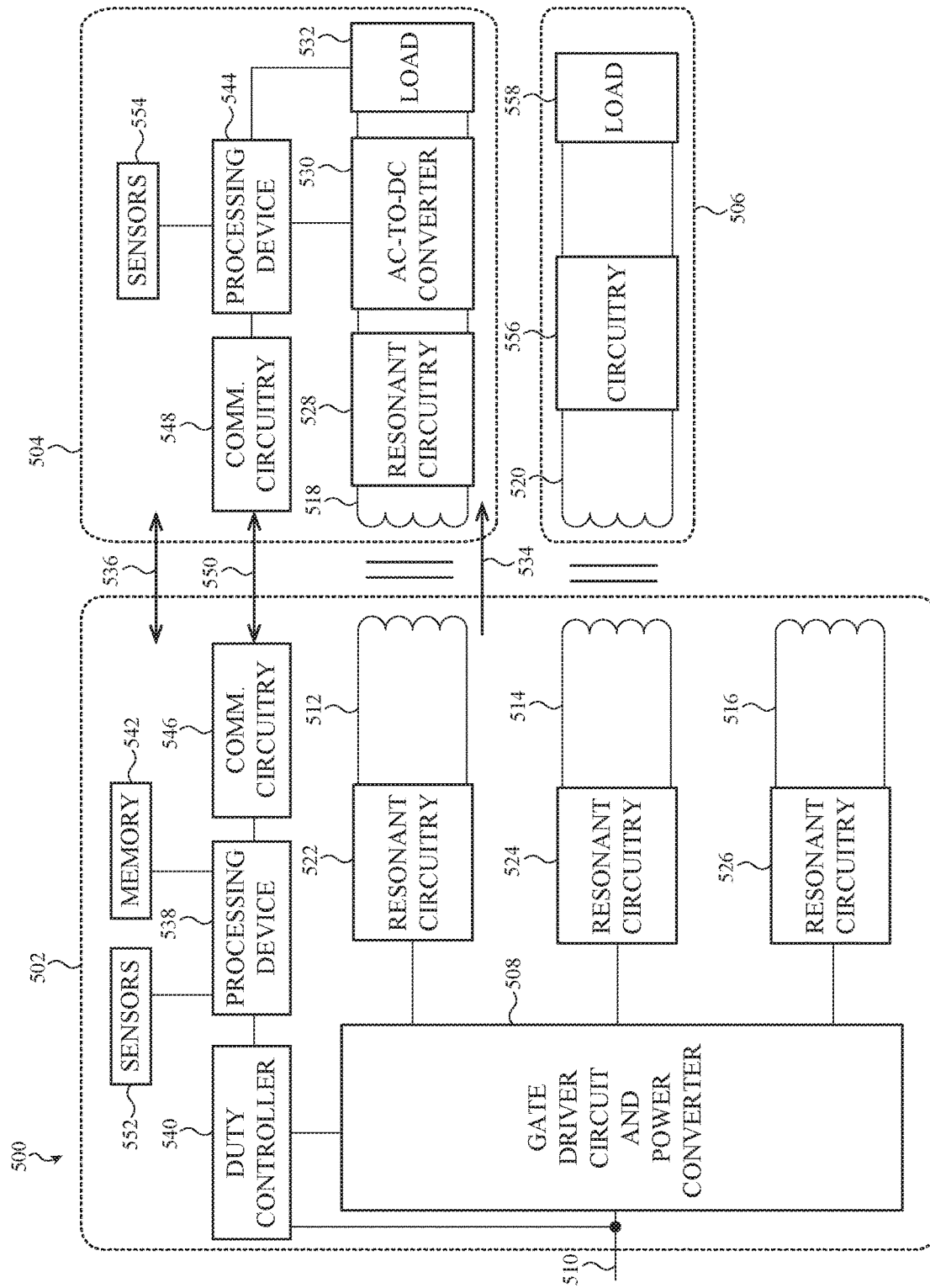
FIG. 5 depicts a block diagram of an example wireless energy transfer system can employ asymmetric duty control.

FIG. 5 shows an example wireless energy transfer system that can employ asymmetric duty control. The wireless energy transfer system 500 includes a transmitter device 502 and two receiver devices 504, 506. For simplicity, only the receiver device 504 is shown in detail. However, those skilled in the art will recognize that the other receiver device 506 can be configured similarly to the receiver device 504. Additionally, each receiver device 504, 506 may each include additional components, circuits, and/or functionality. For example, a receiver device can include a display and/or a touch-sensitive display, network ports, one or more input devices (e.g., trackpad, microphone, button, etc.), and/or one or more output devices (e.g., speakers, haptic device, etc.).

In the illustrated embodiment, a gate driver circuit and half bridge power converter 508 in the transmitter device 502 receives a DC signal (e.g., DC voltage) on a line 510. The line 510 can represent a power cable that is connected to a power adapter (e.g., a power adapter that couples the transmitter device 502 to a power source, such as a wall outlet), a connection to a battery, or a connection (e.g., a USB cable) to another electronic device. In other embodiments, the transmitter device 502 may be configured to receive an AC signal (e.g., AC voltage) on line 510 by connecting an AC-to-DC power converter between the line 510 and the gate driver circuit and half bridge power converter 508. For example, a bridge rectifier can be coupled between the line 510 and the gate driver circuit and half bridge power converter 508.

The gate driver circuit and half bridge power converter 508 is coupled to the transmitter coils 512, 514, 516 through respective transmitter resonant circuitry 522, 524, 526. Each transmitter coil 512, 514, 516 can inductively couple to a respective receiver coil 518, 520 in one or more of the receiver devices 504, 506. The gate driver circuit and half bridge power converter 508 is configured similarly to the gate driver circuit 214 and the half bridge power converter 202 shown in FIG. 2. The gate driver circuit and half bridge power converter 508 includes one or more half bridge power converters. The duty cycles of the upper and lower switching elements in the half bridge power converter(s) are asymmetrically controlled to modify, define, or customize the delivered output energy (e.g., the output voltage) of the transmitter coils 512, 514, 516 and/or to adjust the DC gain of the wireless energy transfer system 500.

As described earlier, each receiver device 504, 506 includes a receiver coil 518, 520. In FIG. 5, the receiver coil 518 can inductively couple with the transmitter coil 512 to transfer energy to the receiver device 504. Similarly, the receiver coil 520 may inductively couple with the transmitter coil 514 for energy transfer. The transmitter coil 516 is not used to transfer energy in the illustrated embodiment. Each transmitter coil 512, 514, 516 can have the same or different characteristics (e.g., number of windings, DC resistance, maximum DC input voltage, the electromagnetic interference, magnetic saturation flux density, Curie temperature, and the like). Similarly, each receiver coil 518, 520 may have the same or different characteristics.

As shown in FIG. 5, the receiver coil 518 is coupled to receiver resonant circuitry 528. The transmitter resonant circuitry 522, 524, 526 and the receiver resonant circuitry 528 can each include one or more electrical components (e.g., resistors, capacitors, inductors) that are used to determine a resonating frequency for the transmitter and receiver devices 502, 504 when energy is transferred to the receiver device 504. The transfer of energy from the transmitter device 502 to the receiver device 504 can be more efficient when the transmitter device 502 and the receiver device 504 resonant at a common frequency.

An output of the receiver resonant circuitry 528 is coupled to an AC-to-DC power converter 530. Any suitable type of AC-to-DC power converter may be used. For example, the AC-to-DC power converter 530 can be constructed as a diode bridge in one embodiment.

A load 532 is coupled to the output of the AC-to-DC power converter 530. The load 532 represents a rechargeable battery and/or one or more components that use the energy received from the receiver coil 518.

The wireless energy transfer system 500 transfers energy through inductive coupling between the transmitter coil 512 and the receiver coil 518 (energy transfer represented by arrow 534). Essentially, energy is transferred from the transmitter coil 512 to the receiver coil 518 by passing an AC coil signal (e.g., AC coil voltage) through the transmitter coil 512 to produce one or more time-varying or oscillating magnetic fields. Energy is transferred to the receiver device 504 when the time-varying magnetic fields extend to, and interact with, the receiver coil 518. The time-varying magnetic fields induce an AC voltage across the receiver coil 518, which in turn produces an AC signal in the receiver coil 518. The AC signal is received by the AC-to-DC power converter 530, which converts the AC signal into a DC signal (e.g., DC voltage). The DC signal is then received by the load 532 (e.g., to charge the battery).

Additionally or alternatively, the transferred energy can be used to transmit communication signals between the transmitter device 502 and the receiver device 504 (communication signals represented by arrow 536). For example, the receiver device 504 may use load modulation to transfer communication signals (e.g., control and/or status data) from the receiver device 504 to the transmitter device 502. As one example, the receiver device 504 can apply a controlled pulsed load across the receiver coil 518, which results in an amplitude modulation of the voltage on the transmitter coil 512. The transmitter device 502 (e.g., or a processing device in the transmitter device 502) can detect and demodulate the amplitude modulation.

Additionally or alternatively, the receiver device 504 may transfer a brief burst of energy (a "ping") to the transmitter device 502 to inform the transmitter device 502 of the presence of the receiver device 504. Additionally or alternatively, the receiver device 504 may transfer a ping to the transmitter device 502 to determine if the transmitter device 502 is ready to transmit energy.

Additionally or alternatively, the transmitter device 502 can use phase shift keying, frequency modulation and the like to transmit communication signals from the transmitter device 502 to the receiver device 504. Additionally or alternatively, the transmitter device 502 may transfer a ping to the receiver device 504 to determine if the receiver device 504 is ready to receive energy and/or to determine a location of the receiver device 504 on the transmitting surface of the transmitter device 502.

A processing device 538 in the transmitter device 502 can be connected to a duty controller 540. Although not shown in FIG. 5, the processing device 538 may be coupled to other components (e.g., a display, memory) in the transmitter device 502. In some embodiments, the processing device 538 may control and/or monitor the operation of the duty controller 540.

The duty controller 540 is connected to the signal line 510 and to the gate driver circuit and half bridge power converter 508. The duty controller 540 may determine the duty cycle of each switching element in the gate driver circuit and half bridge power converter 508 based on the input signal (e.g., DC supply voltage) on the signal line 510.

The processing device 538 may be connected to a memory 542. In some embodiments, the processing device 538 can cause one or more switch signal characteristics that are stored in the memory 542 to be transmitted to the duty controller 540. The switch signal characteristic(s) include, but are not limited to, the duty cycles of the switching elements (e.g., 204 and 208 in FIG. 2) in the gate driver circuit and half bridge power converter 508. The switch characteristics can also include a frequency, a phase, and/or an amplitude of a switch signal. The duty controller 540 may be configured to produce switch signals (e.g., $S_U$ and $S_L$ in FIG. 2) based on the received switch signal characteristic(s).

In some embodiments, the memory 542 can store a lookup table that includes the duty cycles of the switching elements for a number of different DC supply voltages. The processing device 538 can access the memory and read out respective duty cycles based on the DC supply voltage that is received on signal line 510.

The memory 542 can store any suitable electronic data that can be used by the transmitter device 502. For example, the memory 542 can store electrical data or content such as, for example, device settings and user preferences, timing and control signals, switch signal characteristics, data structures or databases, documents and applications, identification data for one or more receiver devices, and so on. The memory 542 can be configured as any type of memory. By way of example only, the memory 542 can be implemented as random access memory, read-only memory, Flash memory, removable memory, or other types of storage elements, or combinations of such devices.

A processing device 544 in the receiver device 504 can be coupled to the AC-to-DC power converter 530 and/or the load 532. Although not shown in FIG. 5, the processing device 544 may be connected to other components (e.g., a display, memory) in the receiver device 504. The processing device 544 may control or monitor the operation of the AC-to-DC power converter 530 and/or the load 532. As one example, the processing device 544 may monitor the charge level on the load 532 when the load 532 is a rechargeable battery.

The processing devices 538, 544 can be implemented as any electronic device capable of processing, receiving, or transmitting data or instructions. For example, the processing devices 538, 544 can each be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

Communication circuitry 546 in the transmitter device 502 may be coupled to the processing device 538 in the transmitter device 502. Similarly, communication circuitry 548 in the receiver device 504 can be coupled to the processing device 544 in the receiver device 504. The communication circuitry 546, 548 can be coupled to one another to establish a communication channel 550 between the transmitter device 502 and the receiver device 504. As described earlier, energy transfer can be used for communication between the transmitter and receiver devices 502, 504. The communication channel 550 is an additional or alternate communication mechanism that is separate from the transfer of energy. The communication channel 550 can be used to convey information from the transmitter device 502 to the receiver device 504, and vice versa. The communication channel 550 may be implemented as a wired link and/or as a wireless link. The communication channel 550 may be configured as any suitable communication channel, such as, for example, Near Field Communication, Bluetooth, and/or Infrared communication channels.

In some embodiments, the transmitter device 502 and/or the receiver device 504 each include one or more sensors 552, 554, respectively. The sensor(s) 552 in the transmitter device 502 are coupled to the processing device 538, and the sensor(s) 554 in the receiver device 504 are coupled to the processing device 544. Each sensor in the sensors 552, 554 may be positioned substantially anywhere on or in the transmitter device 502 and/or the receiver device 504, respectively. The sensor(s) 552, 554 can be configured to sense substantially any type of characteristic, such as, but not limited to, images, pressure, light, heat, force, touch, temperature, movement, and so on. For example, the sensor(s) 552, 554 may each be an image sensor, a temperature sensor, a light or optical sensor, a touch or proximity sensor, an accelerometer, an environmental sensor, a gyroscope, a magnet, and so on.

As will be described in more detail later, one or more sensors 552 in the transmitter device 502 can be configured to detect the presence or absence of the receiver device 504 on or near the transmitting surface of the transmitter device 502. Additionally or alternatively, at least one sensor 552 may be configured to determine a location and/or an orientation of the receiver device 504 on the transmitting surface. For example, one or more touch or proximity sensors can be used to determine whether an object is in contact with the transmitting surface, and an image and/or magnetic sensor(s) may be used to determine if the object is the receiver device 504. Additionally, an image sensor and/or one or more magnetic sensor(s) can be used to identify the receiver device 504, which allows the transmitter device 502 (e.g., the processing device 538) to determine the switch signal characteristics to transmit to the duty controller 540. Alternatively, the identity of the receiver device 504 may be used by the processing device 538 to cause particular switch signals to be transmitted to the gate driver circuit and half bridge power converter 508.

With respect to the receiver device 504, the one or more sensors 554 in the receiver device 504 may be configured to detect or obtain data regarding the receiver device 504. For example, one or more sensors 554 can be used to determine an orientation of the receiver device 504 on the transmitting surface of the transmitter device 502. The orientation of the receiver device 504 may be horizontal (e.g., flat on the transmitting surface) or vertical (e.g., resting on a side of the housing on the transmitting surface). In some embodiments, the receiver device 504 can transmit data to the transmitter device 502 regarding the orientation of the receiver device 504.

The receiver device 506 is shown with a receiver coil 520 connected to circuitry 556 and a load 558 connected to the circuitry 556. As described earlier, the circuitry 556 and the load 558 can be configured similarly to the circuitry (receiver resonant circuitry 528, AC-to-DC power converter 530, communication circuitry 548, processing device 544, and/or sensor(s) 554) and load 532 shown in the receiver device 504. Alternatively, in some embodiments, the receiver device 506 can be configured with different circuitry and/or load.

Although only one the gate driver circuit and half bridge power converter 508, processing device 538, duty controller 540, communication circuitry 546, memory 542, and sensors 552 are shown in FIG. 5, a transmitter device 502 can include multiple gate driver circuit and half bridge power converters, processing devices, communication circuitry, memories, sensors, and/or signal generators. Each gate driver circuit and half bridge power converter can be connected to a respective duty controller, transmitter resonant circuitry, and/or transmitter coil.

Similarly, in some embodiments, the receiver devices 504, 506 may include multiple receiver coils, resonant circuitry, AC-to-DC power converters, loads, communication circuitry, processing devices, and/or sensors. In some embodiments, each receiver coil can be connected to a respective receiver resonant circuitry and an AC-to-DC power converter. Alternatively, two or more receiver coils may share an AC-to-DC power converter and resonant circuitry.

In some embodiments, the gate driver circuit and half bridge power converter 508 can be disposed in a power adapter that is coupled to the transmitter device 502. Additionally, the power adapter may include the duty controller 540, the memory 542, and a processing device. In such embodiments, the gate driver circuit and half bridge power converter 508 can be configured to convert a first AC signal into a second AC signal. The gate driver circuit and half bridge power converter 508 may be coupled to a respective transmitter coil 512, 514, 516. A transmitter coil 512, 514, 516 can receive a converted second AC signal when energy is to be transferred to a respective receiver coil 518, 520. For example, in one embodiment, the gate driver circuit and half bridge power converter 508 may be configured to convert a high voltage, low frequency AC signal into a low voltage, high frequency AC signal.

Figure 6:
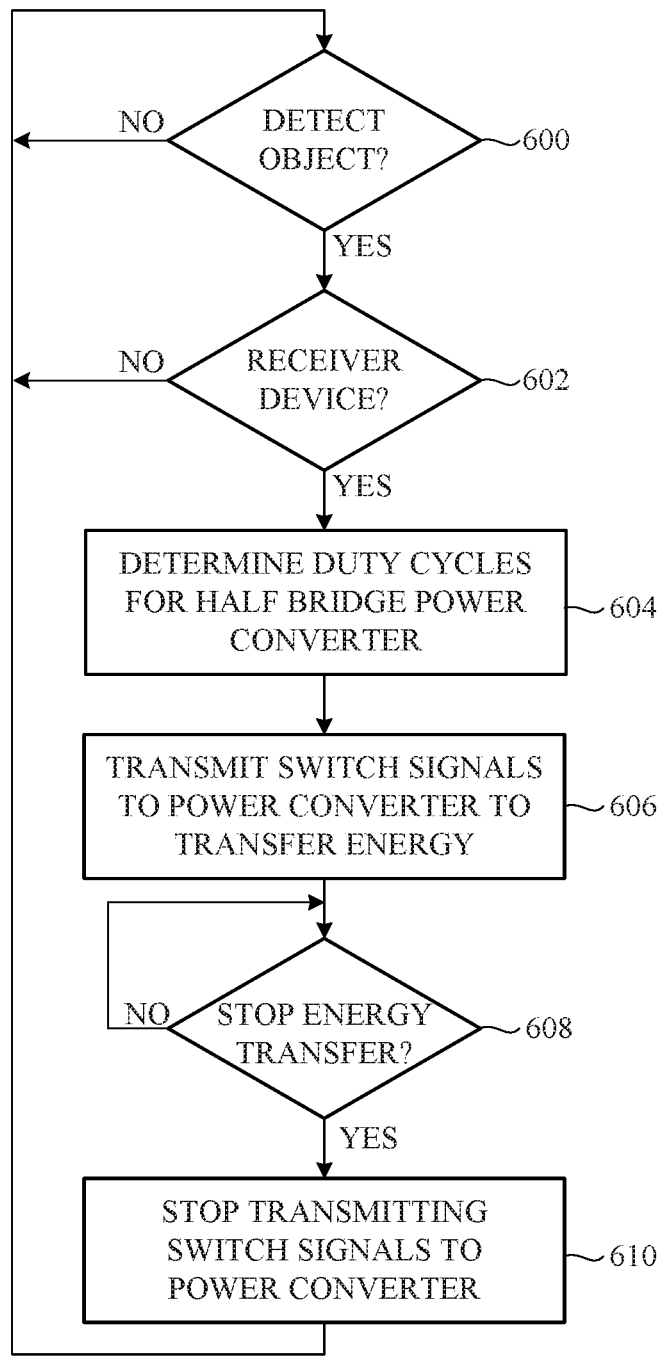
FIG. 6 depicts a flowchart of a first method of operating a wireless transmitter device that includes, or is coupled to, a half bridge power converter.

FIG. 6 depicts a flowchart of a first method of operating a wireless transmitter device that includes, or is coupled to, a half bridge power converter. The process is described in conjunction with a transmitter device that includes only one transmitter coil to transfer energy. Those skilled in the art will recognize the process can be used with transmitter devices that include multiple transmitter coils.

Initially, as shown in block 600, a determination is made as to whether an object is detected on a transmitting surface of a transmitter device. The presence of the object may be determined using a variety of methods. In one embodiment, one or more sensors (e.g., sensors 552 in FIG. 5) can be used to detect the presence of an object on the transmitting surface. For example, a processing device (e.g., processing device 538 in FIG. 5) can receive output signals from one or more touch or proximity sensors. The processing device may be configured to process or analyze the signals to determine whether an object is in contact with the transmitting surface.

Additionally or alternatively, light sensors may be used to detect the presence of an object. In such embodiments, a transmitting surface can include apertures or openings that allow light to be received by light sensors within the transmitter device. When an object is placed on the transmitting surface, the object can block one or more openings and prevent a light sensor (or sensors) from receiving light. A processing device can receive output signals from the light sensors that represent the amount of detected light. The processing device may be configured to process the output signals and, based on the output signals from the blocked light sensor(s) indicating an absence of light, determine an object is in contact with the transmitting surface.

Additionally or alternatively, an image sensor can capture images of the transmitting surface. A processing device may be configured to analyze the images to determine when an object is near or in contact with the transmitting surface of the transmitter device.

Returning to block 600, the process waits at block 600 when it is determined an object is not in contact with the transmitting surface. When it is determined an object is in contact with the transmitting surface, the method passes to block 602 where a determination is made as to whether the object is a receiver device. Any suitable technique can be used to determine if the object is such a receiver device. For example, in one embodiment, the transmitter device may transfer a first ping (e.g., a short burst of energy) to the receiver device and the receiver device can transmit a second ping to the transmitter device in response to the received first ping. Additionally or alternatively, a communication channel (e.g., communication channel 550 in FIG. 5) can be established between the transmitter and receiver devices. A communication signal that is transmitted from the receiver device to the transmitter device can be used to determine if the object is a receiver device.

The process returns to block 600 if it is determined the object is not a receiver device that is configured to receive energy wirelessly. When it is determined the object is a receiver device that is configured to receive energy wirelessly, the method passes to block 604 where the first and the second duty cycles of the upper and lower switching elements are determined. As described earlier, in some embodiments, the first duty cycle can be based on the voltage level of the DC supply voltage.

Next, as shown in block 606, the first and the second switch signals (e.g., $S_U$ and $S_L$ in FIG. 2) are transmitted to the upper and lower switching elements in the half bridge power converter. Thereafter, a determination may be made at block 608 as to whether the transfer of energy is to continue or stop. For example, a processing device in the receiver device (e.g., processing device 544 in FIG. 5) may monitor the charge level on a rechargeable battery (e.g., the load 532 in FIG. 5). When the battery is charged to a sufficient level (e.g., full charge level), the processing device can cause a communication signal to be transmitted to the transmitter device instructing the transmitter device to stop transferring energy. The communication signal can be transmitted through a communication channel (e.g., communication channel 550 in FIG. 5), through load modulation, and/or by causing the receiver device to transfer a ping to the transmitter device.

The method waits at block 608 when the transfer of energy is to continue. When the transfer of energy is to stop, the process passes to block 610 where the transmission of the switch signals to the upper and lower switching elements in the half bridge power converter ceases, which in turn ends the transfer of energy. The method then returns to block 600.

Figure 7:
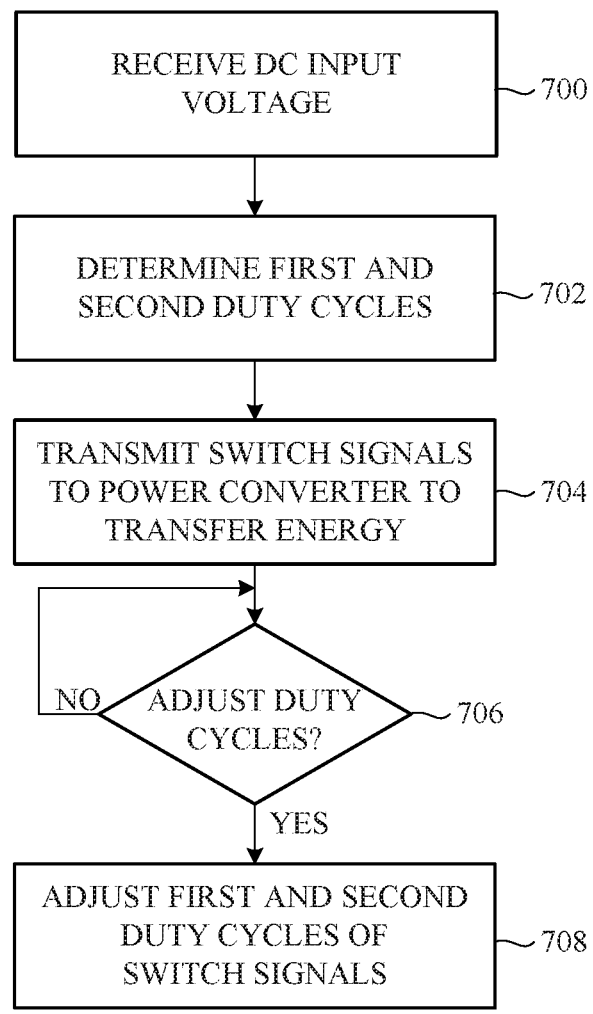
FIG. 7 depicts a flowchart of a second method of operating a wireless transmitter device that includes, or is coupled to, a half bridge power converter.

FIG. 7 depicts a flowchart of a second method of operating a wireless transmitter device that includes, or is coupled to, a half bridge power converter. Initially, a DC supply voltage is received at block 700. As described earlier, the DC supply voltage is coupled to the upper switching element in the half bridge power converter.

Based on the DC supply voltage, the first duty cycle of the upper switching element and the second duty cycle of the lower switching element are determined (block 702). Generally, the first duty cycle is shorter and the second duty cycle is longer when the DC supply voltage is higher. Conversely, the first duty cycle is longer and the second duty cycle is shorter when the DC supply voltage is lower. In this manner, the process can compensate for variations in the DC supply voltage. Compensating for variations in the DC supply voltage may maintain the delivered output energy (e.g., the output voltage) of a transmitter coil at a substantially constant level.

Next, as shown in block 704, the first and the second switch signals (e.g., $S_U$ and $S_L$ in FIG. 2) are transmitted to the upper and lower switching elements in the half bridge power converter. Thereafter, a determination may be made at block 706 as to whether the first and the second duty cycles are to be adjusted. For example, the first and the second duty cycles may be adjusted based on a change in the DC supply voltage. Additionally or alternatively, the first and the second duty cycles can be adjusted to change the gain transfer function of a wireless energy transfer system that includes the wireless transmitter device.

The method waits at block 706 when the first and the second duty cycles will not be adjusted. When the first and the second duty cycles are to be adjusted, the process passes to block 708 where the first and the second duty cycles are adjusted. For example, the first duty cycle may be decreased and the second duty cycle increased to decrease a DC gain of the wireless energy transfer system. Alternatively, the first duty cycle can be increased and the second duty cycle decreased to increase the DC gain of the wireless energy transfer system In some embodiments, the first duty cycle may be increased and the second duty cycle decreased in response to a lower DC supply voltage. Alternatively, the first duty cycle can be decreased and the second duty cycle increased in response to a higher DC supply voltage.

The methods shown in FIGS. 6 and 7 can each omit blocks, add blocks, and/or rearrange the order of the blocks. For example, some of the operations in FIG. 6 may be included in the method of FIG. 7. In one non-limiting example, blocks 600 and 602 may be performed prior to block 700. In another non-limiting example, blocks include additional or different block 700 may be omitted and the first and the second duty cycles determined based on a given DC gain of a wireless energy transfer system. In such embodiments, block 706 may determine whether the first and the second duty cycles are to be adjusted in order to modify the DC gain of the wireless transfer energy system.

In another non-limiting example, the blocks in FIG. 7 can be rearranged so that block 700 is performed after block 704. In such embodiments, block 706 may determine whether the first and the second duty cycles are to be adjusted based on a change in the DC supply voltage. In yet non-limiting example, blocks 608 and 610 may be included in the method shown in FIG. 7. For example, blocks 608 and 610 can be performed after block 708.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A power converter circuit, comprising:
a half bridge power converter coupled between a direct current (DC) supply voltage node and a reference voltage node;
a transmitter coil coupled to the half bridge power converter; and
a duty controller coupled between the half bridge power converter and the DC supply voltage node, wherein the duty controller is configured to:
receive power from the DC supply voltage node; and
adjust a duty cycle of the half bridge power converter based on a real-time voltage level at the DC supply voltage node, thereby compensating for variations in the real-time voltage level at the DC supply voltage node.

2. The power converter circuit of claim 1, wherein:
the half bridge power converter comprises:
an upper switching element coupled between the DC supply voltage node and an intermediate node; and
a lower switching element coupled to the intermediate node and the reference voltage node; and
the duty controller is configured to control:
a first duty cycle of the upper switching element; and
a second duty cycle of the lower switching element, wherein the second duty cycle is greater than the first duty cycle.

3. The power converter circuit of claim 2, wherein a switching frequency of the half bridge power converter comprises a fixed switching frequency.

4. The power converter circuit of claim 2, wherein the duty controller is configured to increase the first duty cycle and decrease the second duty cycle in response to the real-time voltage level at the DC supply voltage node being lower than a threshold.

5. The power converter circuit of claim 2, wherein the duty controller is configured to decrease the first duty cycle and increase the second duty cycle in response to the real-time voltage level at the DC supply voltage node being higher than a threshold.

6. The power converter circuit of claim 2, wherein the power converter circuit is included in a wireless transmitter device in a wireless energy transfer system and the duty controller is further configured to adjust the first and the second duty cycles to adjust a DC gain of the wireless energy transfer system.

7. The power converter circuit of claim 1, further comprising a gate driver circuit coupled between the duty controller and the half bridge power converter.

8. A wireless energy transfer system, comprising:
a transmitter device, comprising:
a half bridge power converter coupled between a direct current (DC) supply voltage source and a ground;
a transmitter resonant circuitry coupled between the half bridge power converter and a transmitter coil; and
a duty controller coupled between the half bridge power converter and the DC supply voltage source; and
a receiver device, comprising:
a receiver coil; and
a receiver resonant circuitry coupled between the receiver coil and a load, wherein the duty controller is configured to:
receive power from the DC supply voltage source; and
adjust a gain transfer function of the wireless energy transfer system by controlling a duty cycle of the half bridge power converter based on a real-time voltage level of the DC supply voltage source, thereby compensating for variations in the real-time voltage level of the DC supply voltage source.

9. The wireless energy transfer system of claim 8, wherein a switching frequency of the half bridge power converter comprises a fixed switching frequency.

10. The wireless energy transfer system of claim 8, wherein:
the half bridge power converter comprises:
an upper switching element coupled between the DC supply voltage source and an intermediate node; and
a lower switching element coupled to the intermediate node and the ground, wherein the duty controller is configured to control,
a first duty cycle of the upper switching element; and
a second duty cycle of the lower switching element, wherein the second duty cycle is greater than the first duty cycle.

11. The wireless energy transfer system of claim 10, wherein the duty controller is configured to increase the first duty cycle and decrease the second duty cycle to increase a DC gain of the gain transfer function.

12. The wireless energy transfer system of claim 10, wherein the duty controller is configured to decrease the first duty cycle and increase the second duty cycle to decrease a DC gain of the gain transfer function.

13. The wireless energy transfer system of claim 8, further comprising a gate driver circuit coupled between the duty controller and the half bridge power converter.

14. A method of operating a wireless transmitter device that includes a transmitter coil coupled to a half bridge power converter, the half bridge power converter comprising an upper switching element coupled in series with a lower switching element that operate at a fixed switching frequency, the method comprising:
receiving a direct current (DC) supply voltage that is coupled to the upper switching element; and
based on a voltage level of the DC supply voltage, controlling a first duty cycle of the upper switching element and a second duty cycle of the lower switching element asymmetrically to regulate an energy output of the transmitter coil, the asymmetrical duty control of the first and the second duty cycles causing the second duty cycle to be greater than the first duty cycle.

15. The method of claim 14, wherein controlling a first duty cycle of the upper switching element and a second duty cycle of the lower switching element comprises:
based on a decrease in the voltage level of the DC supply voltage,
increasing the first duty cycle of the upper switching element; and
decreasing the second duty cycle of the lower switching element to compensate for the decrease in the voltage level of the DC supply voltage.

16. The method of claim 14, wherein controlling the first duty cycle of the upper switching element and the second duty cycle of the lower switching element comprises:

based on an increase in the voltage level of the DC supply voltage, decreasing the first duty cycle of the upper switching element; and increasing the second duty cycle of the lower switching element to compensate for the increase in the voltage level of the DC supply voltage.

17. A method of operating a transmitter device in a wireless energy transfer system, the transmitter device comprising a transmitter coil coupled to a half bridge power converter that includes an upper switching element connected in series with a lower switching element, the method comprising:

transmitting a first switch signal having a first duty cycle to the upper switching element and transmitting a second switch signal having a second duty cycle to the lower switching element to transfer energy from the transmitter coil, wherein a switching frequency of the half bridge power converter is fixed and the second duty cycle is greater than the first duty cycle; and adjusting the first and the second duty cycles to adjust a gain transfer function of the wireless energy transfer system, wherein the adjusted second duty cycle remains greater than the adjusted first duty cycle.

18. The method of claim 17, wherein adjusting the first and the second duty cycles to adjust the gain transfer function of the wireless energy transfer system comprises adjusting the first and the second duty cycles to adjust a direct current (DC) gain of the wireless energy transfer system.

19. The method of claim 18, wherein adjusting the first and the second duty cycles to adjust the DC gain of the wireless energy transfer system comprises:

increasing the first duty cycle of the upper switching element; and decreasing the second duty cycle of the lower switching element to increase the DC gain of the wireless energy transfer system.

20. The method of claim 18, wherein adjusting the first and the second duty cycles to adjust the DC gain of the wireless energy transfer system comprises:

decreasing the first duty cycle of the upper switching element; and increasing the second duty cycle of the lower switching element to decrease the DC gain of the wireless energy transfer system.

* * * * *